F. S. WASHBURN.
PROCESS AND APPARATUS FOR MAKING PHOSPHORIC ACID AND COMPOUNDS OF THE SAME.
APPLICATION FILED FEB. 17, 1914.
1,100,639. Patented June 16, 1914.
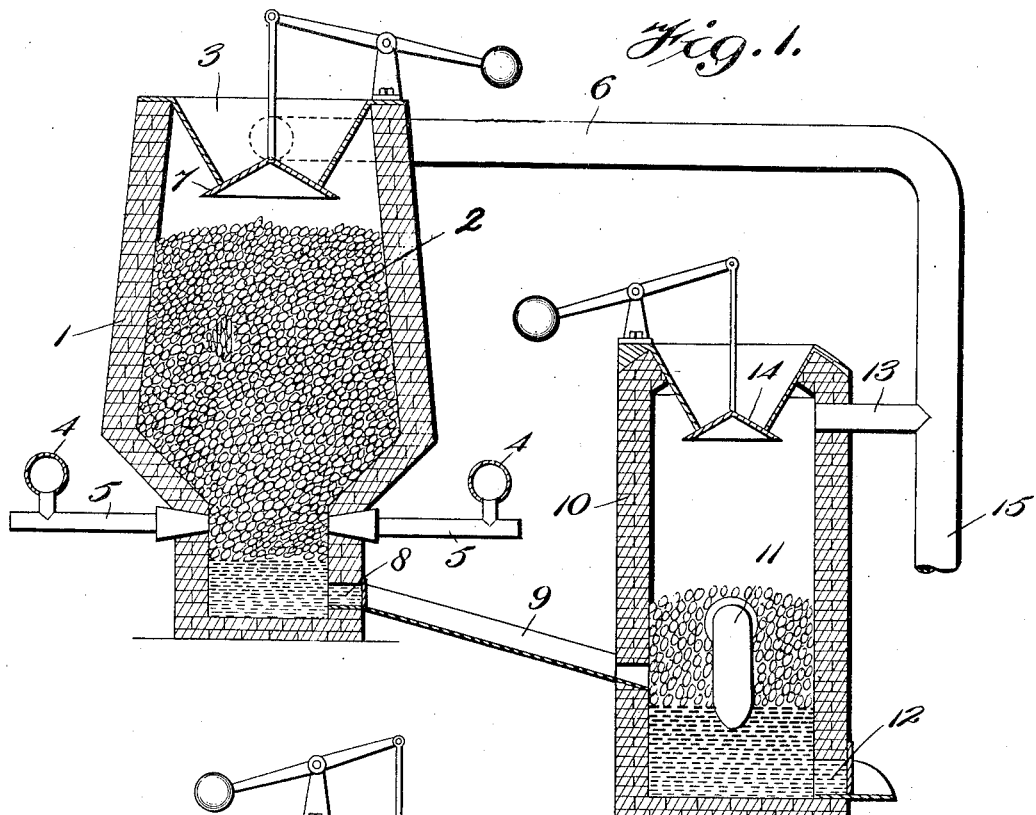
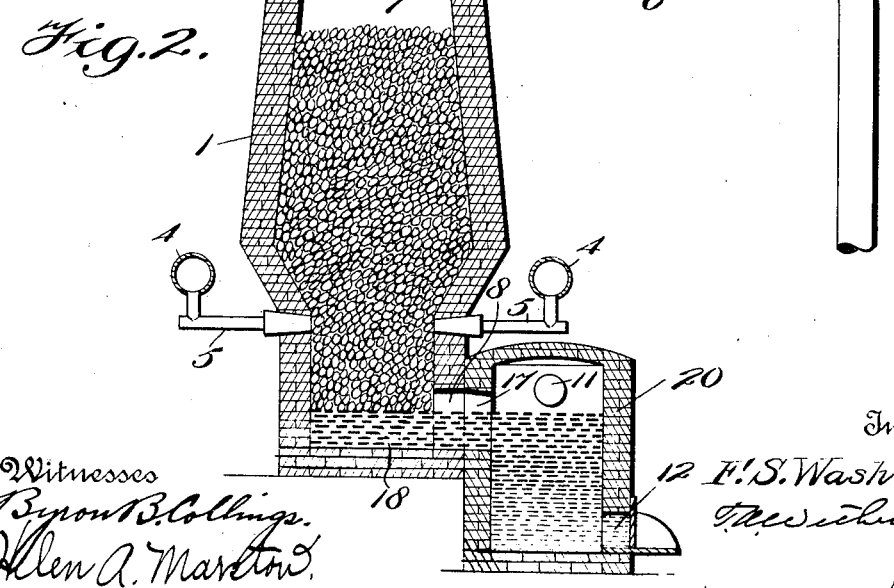

UNITED STATES PATENT OFFICE.

FRANK S. WASHBURN, OF NASHVILLE, TENNESSEE.

PROCESS AND APPARATUS FOR MAKING PHOSPHORIC ACID AND COMPOUNDS OF THE SAME.

1,100,639.  Specification of Letters Patent.  Patented June 16, 1914.

Application filed February 17, 1914. Serial No. 819,240.

*To all whom it may concern:*

Be it known that I, FRANK S. WASHBURN, a citizen of the United States, residing at Nashville, in the county of Davidson and State of Tennessee, have invented certain new and useful Improvements in Processes and Apparatus for Making Phosphoric Acid and Compounds of the Same; and I do hereby declare the following to be a full, clear, and exact description of the invention, such as will enable others skilled in the art to which it appertains to make and use the same.

This invention relates to a new process and apparatus for making phosphoric acid and compounds of the same, and has for its object to make such products and compounds more expeditiously and less expensively than has been heretofore found possible.

With these and other objects in view, the invention consists in the novel steps constituting my process and in the novel combinations of parts all as will be more fully hereinafter disclosed and particularly pointed out in the claims.

In order that the precise invention may be more clearly understood, and distinguished from the prior art, it is said:—It is a well known general principle that an acid is capable of displacing another in a salt combination, when the first acid is less volatile than the second. It sometimes happens, however, that the second acid is either very much stronger in its salt combination than the first, or that there is a possibility of the formation of a double acid salt, in which cases said decomposition does not take place as would be expected from a study of the physical and chemical properties of the salt combination. For instance, when silica is mixed with tricalcium phosphate in the form in which it usually occurs, phosphate rock, and the mass is heated to a temperature above 600° C., the supposed volatilizing point of phosphoric anhydrid, it would be natural to assume that the stronger and less volatile silicic acid would displace the phosphoric acid, forming a calcium silicate and phosphoric anhydrid. But as a matter of fact, at temperatures, even as high as 1300° C. to 1400° C., the evolution of phosphoric anhydrid in such cases, is very small, rarely amounting to more than 25% of the total amount present. These temperatures are very close to the limit of attainable temperatures in a furnace fired by gas, oil or coal fuel, and can only be exceeded by a few hundred degrees, even if the air necessary for combustion, or the fuel, or both are preheated, to the ordinary commercially attainable temperatures in such regenerative systems. I have not in fact been able to obtain a satisfactory evolution of phosphorus from tricalcium phosphate by this method in any style of furnace heated by the combustion of an ordinary fuel. On the other hand, if one continues the heating of this mixture by the use of an electric furnace to temperatures not attainable by furnaces fired by the common fuels, even if regenerative in principle, the evolution of phosphoric anhydrid is very considerably increased. Also if a reducing agent has been mixed in the charge, as for instance charcoal, coke or similar material, this evolution in the electric furnace can be made almost quantitative, in which case the oxidization of any evolved phosphorus to phosphoric anhydrid can be accomplished either in the same furnace or in an auxiliary apparatus, through which the gases and vapors from the furnace are passed. But to perform this operation or decomposition directly in the electric furnace, involves the expenditure of so much electrical energy that at the present cost of the same the process cannot be carried out at a profit, and there are no very large scale developments, so far as I am informed, making use of the electric furnace in the manufacture of phosphoric acid, by this method. To make the above clear the following specific example is given:—Phosphate rock contains from 10–20% calcium carbonate, and this method will drive off the carbon dioxid by the use of coal, at an expenditure of from 0.012 to 0.025 ton of coal per ton of rock. To accomplish this electrically, one would have to use from 200–300 horse power hours of current. With coal at $3.00 per ton, and power at $15.00 per horse power year, this compares in cost as 7½ and 15 cents respectively to 40 and 80 cents respectively. The heat in the slag, per ton of rock charged is, approximately, 10,000,000 cals., as tapped, or equivalent to 1600 horse power hours, or $3.20 worth of electric energy; while the coke requirement in the furnace for heating is about 40% of its weight to the rock charged, or approximately, is worth only $2.00, coke being $5.00 per ton. One can thus save by a combined process, in the portion of the reaction above described, over $1.00 worth of electrical energy.

In the work carried out by myself on this combined process, I have proved conclusively that a mixture of phosphate rock, silica, and a suitable fuel could be fed to a shaft furnace, similar to a small, iron blast furnace, and with a cold blast I could melt the mass down to a viscous slag, which would barely run out of the furnace. I also proved by the use of a hot blast, produced in an ordinary hot blast stove, that the slag could be readily tapped from the furnace. I have further demonstrated that by the use of very rich oxygenated air, which is conveniently obtained as a by-product from a liquid air plant, such as is used to produce nitrogen for the cyanamid industry, at the plant of the American Cyanamid Company, for example, instead of the ordinary cold air employed in the early experiments, I can with its assistance readily fuse a suitable furnace charge to a slag which can be tapped out of the furnace without difficulty. This slag, containing large quantities of phosphoric acid, in a form which seems to be a double phospho-silicate of calcium, I find can be run directly into an electric furnace and further heated to drive off the rest of the contained phosphoric acid that was not eliminated in the shaft furnace. The cheaply operated shaft furnace in this way is made to separate a product for the finishing operation of the electric furnace, and the amount of expensive electrical energy needed to finish the evolution of the phosphoric acid is reduced to such a point that the process can be made to compete with the usual sulfuric acid method of producing phosphoric acid.

In order to save the electrode consumption of the electric furnace, and further assist in the evolution of the phosphoric acid, coke, or other carbonaceous material is or may be fed into the electric furnace along with the slag, and the operation completed, under reducing conditions.

The gases evolved from the shaft furnace, and the electric furnace, are together led to a common oxidization chamber, and any unoxidized phosphorus contained in them is there caught by a suitable absorbing medium, such as water, ammoniated water, or they may be even condensed directly by the use of gaseous ammonia to an ammonium phosphate, which is eminently suited to fertilizer purposes.

I find by the use of this combined furnace method it is quite possible to obtain an almost complete evolution of the phosphoric acid from phosphate rock, with an expenditure of electrical energy less than half that required by the electric furnace alone. I also find the gases obtained are sufficiently concentrated in phosphorus pentoxid to offer no serious difficulty in their absorption, and that the process possesses no difficulties from an operative standpoint, such as is possessed by the shaft furnace alone, particularly if heated air, or preferably enriched air is used in the same.

I am not able to scientifically demonstrate the actual chemical changes upon which the above results depend but tests carried out on a large scale under my direction lead me to believe that the step of heating the rock with carbon in a fuel fed furnace not only causes the evolution of a considerable portion of the contained phosphorus within commercial limits, but it also so changes the chemical relations of the remaining phosphorus in the mixture that it requires a less amount of chemical work to be done in the electric furnace than would otherwise be the case. In other words, although the preheating in the shaft furnace aids the operation in the electrical furnace, yet, in addition to this the material charged into the electric furnace no longer has the same chemical composition it originally had, and its bonds are found to be more easily broken by the current owing to this chemical change.

Phosphate rock as is well known, is of extremely variable composition, and I have found that in this combination process it is advisable to determine the lime content and formulate a charge for the shaft furnace that will finally form a slag containing, approximately, lime and silica in the proportions of 35 to 45 parts of silica and 50 to 65 parts of lime. Further addition of silica can, of course, be made in the electric furnace if it is found advisable to increase the facility of evolution of phosphoric acid from certain types of slags which are found to be best suited to shaft furnace operation. I have found, however, that slags containing as high as 45% silica offer no trouble to the shaft furnace operation, if the air is sufficiently enriched in oxygen to enable the attainment of suitable fusion temperatures in this furnace.

In the accompanying drawing I have illustrated by way of example, one arrangement of furnaces which may be used in carrying out this process, but do not limit myself to the use of this specific form of individual apparatus.

Referring to the accompanying drawings forming a part of this specification, in which like numerals designate like parts in all the views:—Figure 1 is a diagrammatic sectional view illustrating a shaft furnace and an electric furnace, adapted to receive the slag from the shaft furnace; and Fig. 2 is a diagrammatic sectional view of a modified form of apparatus, for carrying out my invention.

1 represents a shaft furnace in which the phosphate rock and flux 2 is charged through the top 3.

4 represents the usual bustle pipe through which is conducted preheated or enriched air, and 5 represents the twyers for conveying said air to the charge tube.

6 represents a pipe for carrying off the gases from the shaft furnace, and 7 a valve or other apparatus for controlling the admission of the charge to the furnace through the opening 3.

8 represents the tap hole for withdrawing the slag and 9 represents a trough or conveyer for leading the slag to the electric furnace 10.

11 represents any suitable carbon electrode projecting through the sides of the furnace 10. 12 a tap hole for said electric furnace for removing the slag, and 13 a gas exit communicating with the pipe 6.

14 represents a charging apparatus for the electric furnace and 15 a continuation of the pipes 6 and 13 for conducting the evolved gases to oxidation chambers or absorbers, not shown.

In the modified form of my invention shown in Fig. 2, the tap hole 8 of the shaft furnace is continuous with an opening 17 in the electric furnace 20, so that the molten material 18 may run directly from the shaft furnace to the electric furnace, and there further heated. In this modified form, the gas from the electric furnace 20, may pass up through the opening 17 and tap hole 8 to the shaft furnace and there mixed with the gases produced in said shaft furnace 1.

When I employ enriched air and a low shaft furnace, the gases of combustion are largely $CO_2$, and little oxidization is found necessary to render all the evolved phosphorus in the anhydrid form. This may be readily accomplished by admitting oxygen in any suitable form to the evolved phosphorus.

It is obvious that those skilled in the art, may vary the steps of my process, as well as the arrangement of parts and the details of construction of my apparatus, without departing from the spirit of my invention, and therefore I do not wish to be limited to the above disclosure except as may be required by the claims.

What I claim is:—

1. The process of making phosphoric acid and compounds of the same consisting in mixing phosphate rock, silicious material and a carbonaceous material in suitable proportions; charging the same into a furnace; effecting the combustion of said carbonaceous material by air blown in said furnace, thereby preheating the mass to a high temperature and liberating a portion of its contained phosphorus; discharging said preheated mass into an electric furnace; and continuing heating to a higher temperature through the agency of electricity until substantially all the phosphorus has been eliminated, substantially as described.

2. The process of making phosphoric acid and compounds of the same consisting in mixing phosphate rock, silicious material and a carbonaceous material in suitable proportions; charging the same into a shaft furnace; effecting the combustion of said carbonaceous material by preheated air fed to said furnace thereby preheating the mass to a high temperature and liberating a portion of its contained phosphorus; discharging said preheated mass into an electric furnace and continuing the heating of the same to a higher temperature until substantially all the phosphorus has been eliminated; and condensing and absorbing the phosphoric anhydrid thus produced in a suitable absorption apparatus, substantially as described.

3. The process of making phosphoric acid and compounds of the same, consisting in mixing phosphate rock, silicious material, and a carbonaceous material in suitable proportions; charging the same in a shaft furnace; effecting the combustion of the said carbonaceous material by the use of oxygenated or enriched air, fed to said furnace, thereby preheating the mass to a high temperature; discharging said preheated mass into an electric furnace; and continuing heating said mass until substantially all the phosphoric acid has been eliminated, substantially as described.

4. The process of making phosphoric acid and compounds of the same, consisting in mixing phosphate rock, silicious material, and a carbonaceous material in suitable proportions; charging the same in a shaft furnace; effecting the combustion of the said carbonaceous material by the use of oxygenated or enriched air, fed to said furnace, thereby preheating the mass to a high temperature; discharging said preheated mass into an electric furnace; continuing heating said mass until substantially all the phosphoric acid has been eliminated; and condensing and absorbing the phosphoric anhydrid in suitable absorption apparatus for the purpose, substantially as described.

5. The process of making phosphoric acid and compounds of the same, consisting in mixing prosphate rock, silicious material and a carbonaceous material in suitable proportions; charging the same in a shaft furnace; effecting the combustion of the carbonaceous material by the use of air fed to said furnace, thereby preheating the mass to a high temperature and liberating a substantial portion of the contained phosphorus; discharging said preheated mass into an electric furnace; and continuing heating said mass with the addition of silicious and carbonaceous material, until practically all the phosphorus has been eliminated, substantially as described.

6. The process of making phosphoric acid and compounds of the same, consisting of mixing phosphate rock, silicious material and a carbonaceous material in suitable proportions; charging the same in a shaft furnace; effecting the combustion of the said carbonaceous material by the use of oxygen carried by air fed to said furnace; thereby preheating the mass to a high temperature; discharging said preheated mass into an electric furnace; continuing heating the same to a higher temperature while adding silicious and carbonaceous material, until practically all the phosphoric acid has been eliminated; combining the gases evolved by the two furnaces; and passing the same into suitable condensing and absorbing apparatus for the purpose of removing the phosphoric acid from said gases, substantially as described.

7. The process of making phosphoric acid and compounds of the same, consisting in mixing phosphate rock, silicious material and a carbonaceous material in suitable proportions; charging the same into a shaft furnace; effecting the combustion of the carbonaceous material by the use of enriched air fed to said furnace, thereby preheating the mass to a high temperature; discharging said preheated mass into an electric furnace; continuing heating to a higher temperature while adding silicious and carbonaceous material, until substantially all the phosphoric acid has been eliminated; oxidizing any phosphorus which may have been evolved in its elemental state to phosphoric pentoxid; combining the gases from the two furnaces; and absorbing the phosphoric acid in suitable absorption agents, substantially as described.

8. The process of making phosphoric acid, and compounds of the same, consisting in mixing phosphate rock, silicious material and a carbonaceous material in suitable proportions; charging the same in a furnace; effecting the combustion of the carbonaceous material by the use of air, thereby preheating the mass to a high temperature and liberating a substantial proportion of the contained phosphorus; discharging said preheated mass into an electric furnace; continuing heating said mass until substantially all the phosphorus has been eliminated; and passing the gases evolved by one of the two furnaces through the other furnace and thereby combining said gases, substantially as described.

9. The process of making phosphoric acid and compounds of the same, consisting in mixing phosphate rock, silicious material and a carbonaceous material in suitable proportions; charging the same in a shaft type of furnace; effecting the combustion of the carbonaceous material by the use of enriched air, fed to said furnace; discharging said preheated mass into an electric furnace, and continuing heating the same while adding silicious and carbonaceous material, until substantially all the phosphoric acid has been eliminated; combining the gases from the two furnaces; oxidizing any reduced phosphorus to the form of pentoxid; and absorbing the phosphoric acid by the use of suitable absorbing agents, substantially as described.

10. In an apparatus for producing phosphoric acid and other compounds, the combination of a shaft furnace; means for feeding the same with air and fuel to heat the same to a temperature sufficient to liberate phosphorus from phosphate rock; an electric furnace; means for heating the same by electricity to a temperature higher than that attainable in the shaft furnace; means for transferring the molten mass after a portion of its phosphorus has been liberated from said shaft furnace to said electric furnace; and means for mixing and drawing off the gases evolved from both of said furnaces, substantially as described.

In testimony whereof I affix my signature, in presence of two witnesses.

FRANK S. WASHBURN.

Witnesses:
E. T. HARTIGAN,
GEO. M. RHODES.